April 19, 1949.   G. L. N. MEYER ET AL   2,467,684
FILLER VALVE
Filed April 29, 1946   3 Sheets-Sheet 2
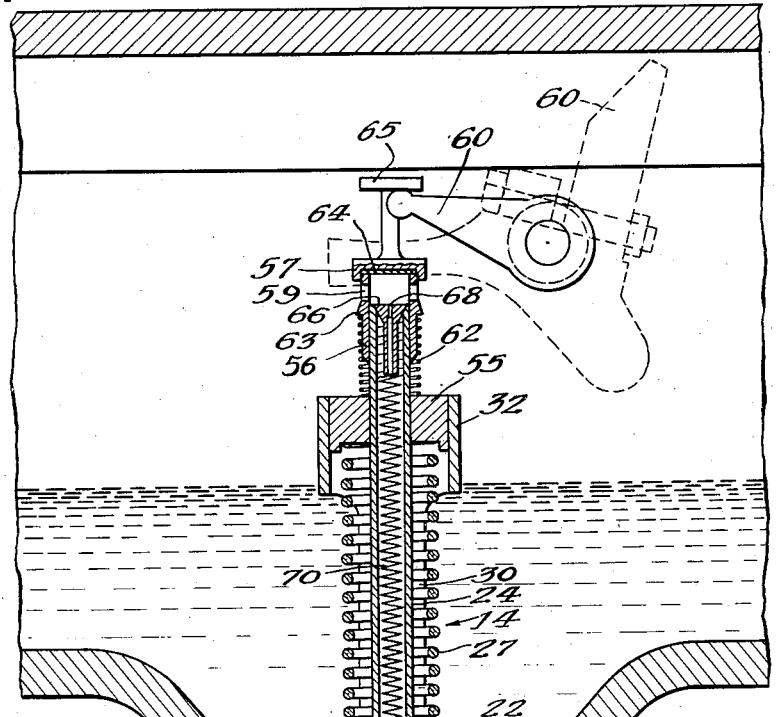
Fig. 5.   Fig. 2.
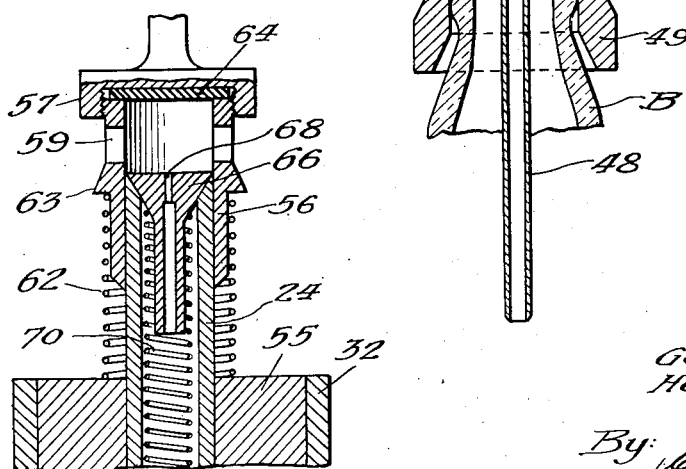
Inventors:
George L. N. Meyer
Henry F. Stock
By Eugene H. Simpson
Attorney April 19, 1949. G. L. N. MEYER ET AL 2,467,684
FILLER VALVE
Filed April 29, 1946 3 Sheets-Sheet 3

Inventors:
George L. N. Meyer
Henry F. Stock
By: Eugene W. Simpson
Attorney

Patented Apr. 19, 1949

2,467,684

UNITED STATES PATENT OFFICE 2,467,684

FILLER VALVE

George L. N. Meyer, Milwaukee, and Henry F. Stock, Waukesha, Wis., assignors to Geo. J. Meyer Manufacturing Co., Cudahy, Wis.

Application April 29, 1946, Serial No. 665,753

15 Claims. (Cl. 226—111)

This invention relates to bottling machinery, and more particularly to a counter-pressure filler valve.

In counter-pressure fillers the vent tube extends upwardly above the level of the liquid, and is of sufficient size to permit adequate venting of the counter-pressure gas from the container during filling thereof, thus providing a maximum filling speed, and maximum machine output. In filling glass bottles, it has been found that the vent tube, when of sufficient size to properly vent the counter-pressure gas from the bottle during filling, permits a surge of counter-pressure gas into the bottle during charging and that such a surge of pressure is, at times, sufficient to rupture weak or defective bottles. When bottles break during filling it is necessary to stop the machine to clean off loose glass, thereby reducing the output and efficiency of the machine.

One object of the present invention is to provide a filler valve which will admit counter-pressure gas gradually to the container during charging while permitting free venting of the gas from the container during filling.

Another object is to provide a filler valve which will reduce the number of bottles broken.

Another object is to provide a filler valve for counter-pressure fillers which will increase the efficiency of the filler.

A further object is to provide a filler valve which will require a minimum of maintenance.

A still further object is to provide a filler valve for counter-pressure fillers which will decrease the cost of operation thereof.

Other objects will become apparent upon considering the following specification, which when taken in conjunction with the accompanying drawings, illustrate a preferred form of the invention.

In the drawings:

Fig. 2 is a view similar to Fig. 1 but showing the vent valve in open position;

Fig. 5 is an enlarged cross sectional view of the top of the vent tube, as shown in Fig. 2, with the bleed valve in place.

Figure 1:
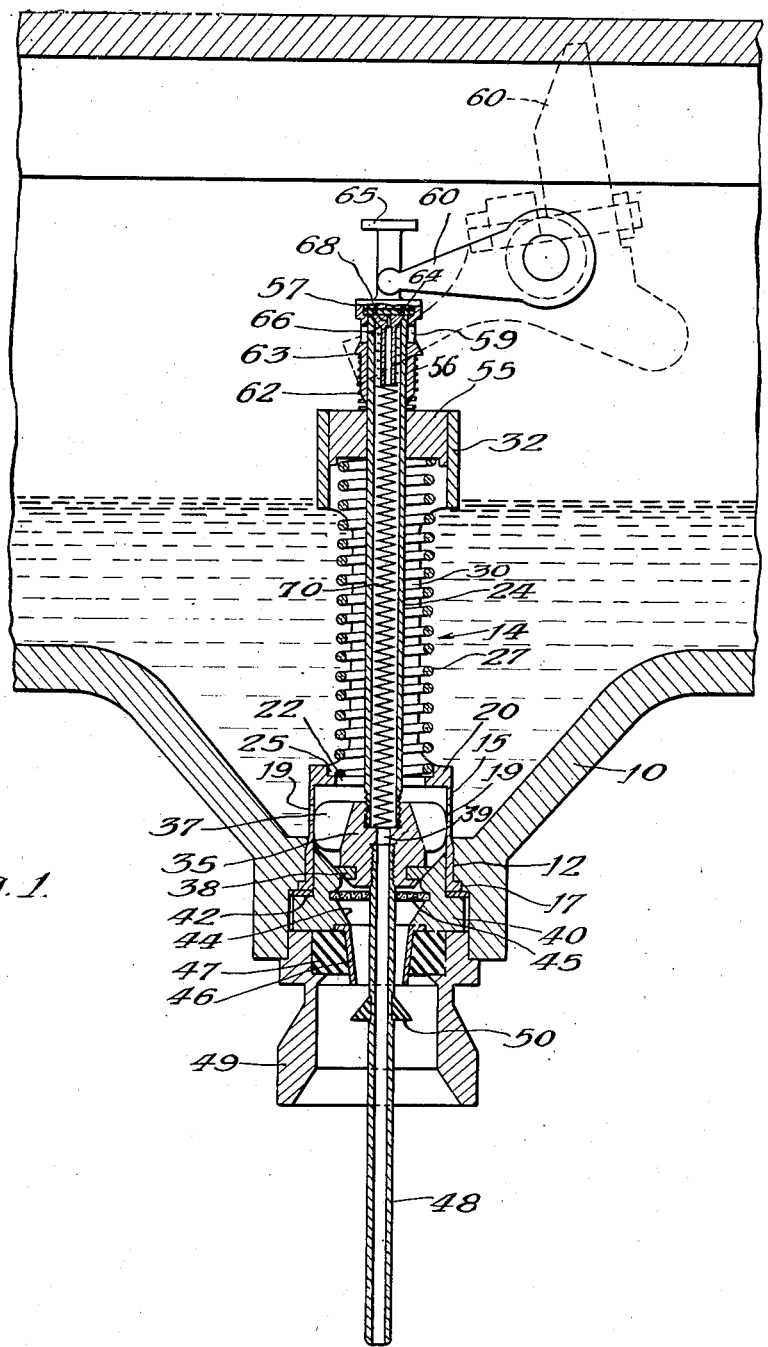
Fig. 1 is an elevational cross section through a filler valve, illustrating the invention and showing all elements of the valve closed.
Figure 1:
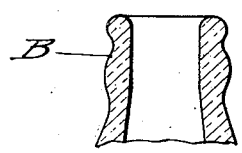
Figures 3, 4:
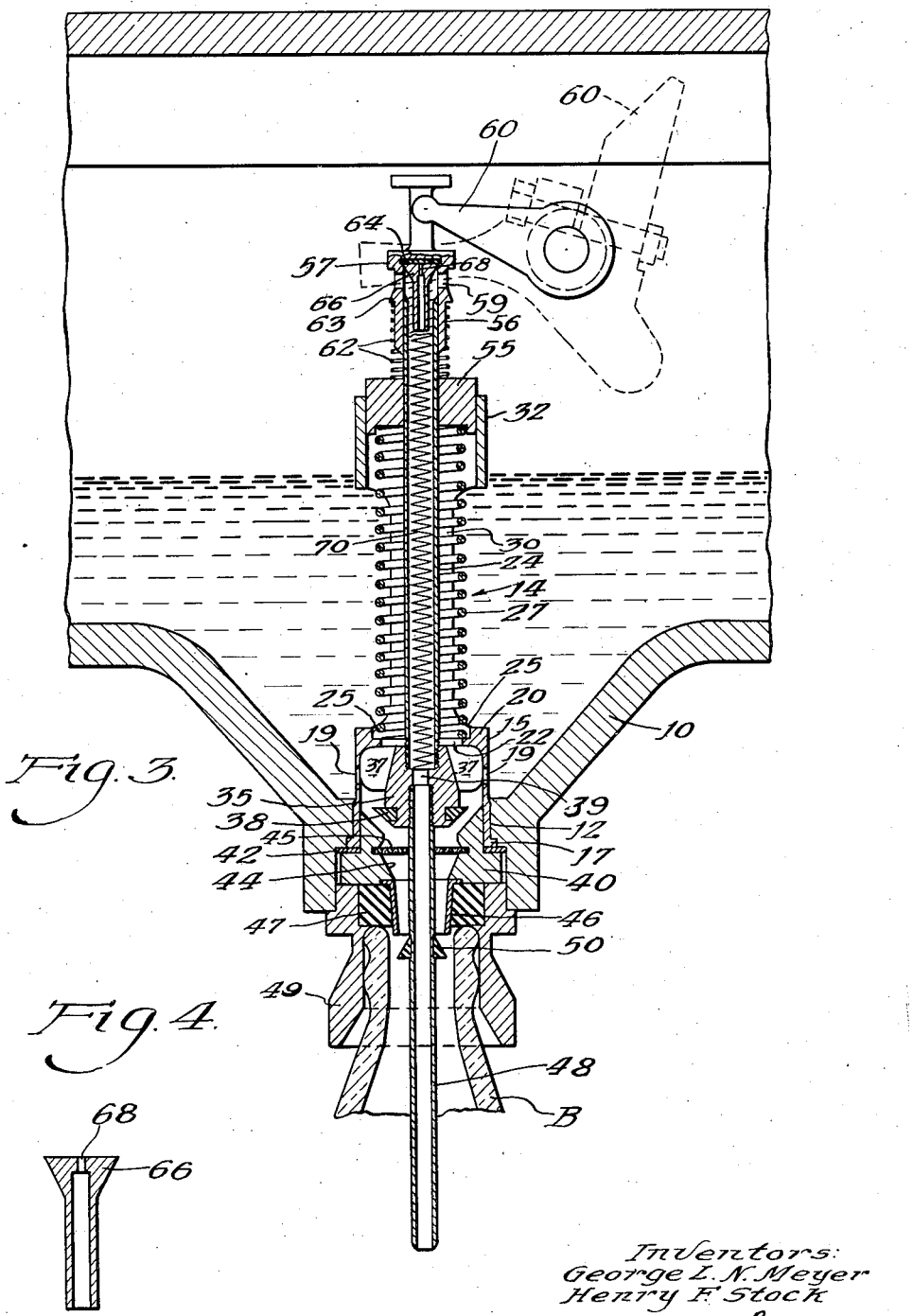
Fig. 3 is a view similar to Figs. 1 and 2 but with all valves open.
Fig. 4 is a detail of the bleed valve element.

Referring to the drawings, the filling machine comprises an annular bowl 10 (a portion of which is shown) having a plurality of openings 12 (of which only one is shown) spaced about the lower side of the periphery of the bowl. Each opening 12 receives a filler valve generally designated 14.

The valve 14 has a cage 15 with an outstanding flange 17 at the bottom of the cage, the cage fitting into the opening 12 with the flange 17 abutting a shoulder formed in the opening. The cage 15 has a plurality of openings 19 therethrough, above the top of the opening 12, which permit the liquid from the bowl 10 to pass into the cage 15, through the valve and into the container B.

The upper surface of the cage 15 has a cover formed integrally therewith which is provided with an axial opening 22 through which passes a tube 24. The periphery of the opening 22 is provided with an annular recess 25 which forms a retainer for the lower end of a spring 27, the function of which is more fully set forth below.

The sides of the cage 15 have a pair of fingers 30—30 formed integrally therewith, one on each side of the cage. The fingers 30 extend upwardly from the cage 15 and terminate in a cylindrical bearing 32, which may be formed integrally on the upper ends of the fingers.

The valve cage 15 contains a valve body 35 having a plurality of wings 37 formed thereon. The wings 37 have a sliding fit in the interior of the cage 15 and serve to center the valve 35 in the cage and to guide the vertical movement of the valve in opening and closing. The valve 35 has a vertical aperture 39 therethrough in one end of which is mounted the tube 24, and in the opposite end of which is mounted a vent tube 48.

A valve closure member 38 comprising a soft rubber ring is mounted in an annular recess in the valve body 35. The closure member 38 has a tapered outer edge which normally seats on a conical valve seat 40.

The conical valve seat 40 terminates in a passageway 44, through which the vent tube 48 extends. The passageway has a screen 45 held in an annular recess in the passageway 44, the screen having a central opening for the passage of the vent tube 48. The screen or other foraminous element 45 is adapted to stop the flow of liquid downwardly when the pressure within the bottle exceeds the downward pressure of the liquid.

The passageway 44 opens into a nipple 46 which is held in a rubber sealing ring 47. The sealing ring 47 is held in engagement with the valve seat element 40 by means of an annular centering ring 49. The centering ring 49 is retained in place by a stirrup (not shown) attached to the bowl 10, which presses upward on the centering ring to retain the entire valve 14 in the aperture 12.

For further details of the action of the closure 38 see the co-pending application of George L. N. Meyer, Serial No. 623,240, filed October 19, 1945, entitled Filler valve.

The vent tube 48 is provided with a spreader element 50 which causes liquid flowing down the vent tube 48 to be deflected onto the interior of the bottle B and thus preclude choking of the vent tube with consequent improper venting.

The tube 24, which is secured in the aperture 39 in the valve body 35, projects upwardly through the aperture 22 in the top of the cage 15 and passes through the cylindrical bearing 32 and extends above the surface of the liquid in the bowl 10. A bearing block 55 is fixed on the tube 24 where it passes through the bearing 32 and is adapted to guide the upper end of the tube 24 during opening and closing of the valve 35.

The spring 27, which has its lower end seated in the recess 25 in the top of the valve cage 15, bears against the lower side of the bearing block 55, and constantly urges the valve 35 into open position against the pressure of the liquid on top of the valve 35 and closure member 38.

Referring particularly to Fig. 5, the tube 24 is provided with a sleeve valve 56 fitting over the top of the tube 24. The valve 56 has a plurality of apertures 59, which, when the valve is moved upwardly, permit counter-pressure gas to flow through the tube 24 to and from the container B.

The valve 56 is constantly urged into open position, with the ports above the upper edge of the tube 24, by a spring 62 which abuts the bearing block 55 at the lower end of the spring and abuts a shoulder 63 formed on the sleeve valve 56 at the upper end of the spring 62.

The top of the sleeve valve 56 is closed by a cap 57 which screws onto the top of the valve 56 and binds a rubber seal disc 64 in place on the top of the valve. The disc 64 forms a seal preventing the escape of counter-pressure gas from the bowl when the valve 56 is closed. The cap 57 has a cam follower 65 attached thereto, the follower 65 being actuated by a cam 60 to open and close the valve 56.

A bleed valve 66 is mounted in the upper end of the tube 24 and has a bleed opening 68 to permit counter-pressure gas flowing from the bowl 10 through the opening 59 to bleed gradually through the opening 68, the tubes 24 and 48 into the bottle B, thus preventing a sudden surge of pressure downwardly into the bottle and reducing breakage during filling. The bleed valve 66 is urged into open position by a spring 70 mounted in the tube 24 and bearing at its lower end against the valve body 35. The upper end of the spring presses upwardly on the valve 66 which is maintained closed until pressure is equalized above and below the valve 66 by the counter-pressure. When counter-pressure builds up below the valve 66 the spring 70 becomes effective to open the valve 66 and permit gas to pass freely in either direction through the tube 24.

Operation

In operation, the bottle B enters a filling machine from a washer and is raised by a stirrup (not shown) into sealing engagement with the sealing ring 47 and centered thereon by a centering ring 49. When the bottle is sealed against the ring 47 and held there under pressure by the stirrup a projection (not shown) contacts the cam 60 which raises the cam follower 65 secured to the cap 57 of the valve 56 raising that valve and permitting counter-pressure from the top of the bowl 10 to flow through the openings 59 in the valve 56 and through the bleed opening 68 in the bleed valve 66 downwardly through the tube 24, through the opening 39 in the center of the valve body 35, through the vent tube 48 and into the bottle B. The counter-pressure gas continues to flow through the bleed opening 68 at a relatively low rate until the pressure in the bottle is substantially that in the top of the bowl. At this point the spring 70 raises the valve 66 off its seat on the top of the tube 24 and at substantially the same time the spring 27 acts to raise the valve 35 permitting the valve closure 38 to move off the conical valve seat 40 and permit the beverage to flow through the opening 19, through the passage 44, and downwardly through the screen 45 and nipple 46, off the spreader element 50 and onto the interior of the sides of the bottle B.

As the liquid rises in the bottle the counter-pressure gas in the bottle passes upwardly through the vent tube 48, through the tube 24, past the exterior of the bleed valve 66 and out the holes 59 into the top of the filler bowl.

During the filling the bleed valve 66 is completely off its seat providing substantially an unobstructed passage for the upwardly flowing counter-pressure gas. When the level of the liquid in the bottle rises above the bottom of the vent tube 48 the pressure of the gas in the top of the bottle builds up to equal the counter-pressure above the liquid in the bowl and the foraminous element 45 becomes effective to stop the flow of liquid downwardly. At this point a second projection on the stationary portion of the filler contacts a portion of the cam 60 causing the cam to turn counter-clockwise, as seen in the drawings, to close the valves 35, 56 and 66 mechanically. The counter-pressure is sniffed out of the top of the bottle by a snift valve, not shown, and the bottle is then lowered from sealing engagement with the seal 47 and is transferred to a capping machine where it is sealed.

It has been found that while the valve 66 will operate successfully without the spring 70, the spring 70 causes faster operation of the valve 66 and gives increased efficiency to the entire valve 14 resulting in faster filling of the bottles.

It will be realized that the hereinbefore described form of the invention is to be taken merely as a preferred embodiment thereof and that various changes in size, shape and arrangement of parts may be made without departing from the spirit of the invention or the scope of the subjoined claims.

That which is claimed as new and is desired to be secured by Letters Patent is:

1. In a counter-pressure filler of the character described a filler bowl containing a liquid with a counter-pressure gas above said liquid, a tube extending into said filler bowl and opening into the area of said counter-pressure gas, a valve to control the flow of gas through said tube and means to vary the rate of flow of the counter-pressure gas dependent upon the direction thereof.

2. In a counter-pressure filler including a filler bowl containing liquid with a counter-pressure gas above said liquid, a tube extending into said bowl above the level of the liquid therein, a valve adapted to open at a predetermined time to permit the flow of counter-pressure gas into a bottle and a bleed valve adapted to reduce the rate of flow of counter-pressure gas into said bottle while permitting the unrestricted flow of gas out of said bottle.

3. In a counter-pressure filler having a bowl, a liquid in said bowl with a counter-pressure gas above said liquid, a filler valve comprising a liquid valve, a passageway through said liquid valve, a vent tube mounted in the lower end of said passage and extending into a container to be filled, a tube mounted in the upper end of said passage and extending through said liquid into said counter-pressure gas, a gas control valve mounted on said tube and adapted to be retained closed by the counter-pressure thereon, means to open said gas control valve mechanically, a valve in said tube having a bleed opening therethrough adapted to bleed counter-pressure gas gradually from said bowl into the container, and means to effect the opening of said last named valve upon the attainment of a predetermined counter-pressure in the container.

4. In a counter-pressure filler including a bowl having a liquid in the lower portion thereof with a counter-pressure gas above said liquid, a filler valve comprising a liquid valve adapted to supply liquid to a container to be filled, a passageway through said liquid valve, a vent tube in the lower end of said passageway extending into said container, a tube in the upper end of said passageway extending through said liquid and into said counter-pressure gas, a gas control valve mounted on said tube and normally held in closed position by the counter-pressure gas, means urging said last named valve into open position, a valve mounted in the upper end of said tube having a bleed opening therethrough adapted to bleed counter-pressure gas from said bowl gradually into the container, and means to open said last named valve upon the attaining of a predetermined counter-pressure within the container to permit the unrestricted flow of gas from the container to the bowl.

5. In a counter-pressure filler including a bowl having liquid in the lower portion thereof with counter-pressure gas above said liquid, a filler valve comprising a liquid valve adapted to control the flow of liquid into a container to be filled, means to supply counter-pressure gas from said filler bowl to said container, means to control the flow of gas through said last named means and means to regulate the rate of flow of gas from the bowl through the gas supply means to the container, said regulating means being operable, after the attainment of counter-pressure within the container, to permit free flow of gas from the container to the bowl.

6. In a counter-pressure filler valve of the character described, a vent tube, a gas control valve to control the flow of gas through said vent tube, said gas control valve having a bleed opening therein, and a spring mounted in said vent tube to open said last named valve upon the attainment of a predetermined counter-pressure beneath said last named valve to permit free flow of gas through said vent tube from the container to the bowl.

7. A valve mechanism for counter-pressure fillers comprising, a hollow stem, a liquid control valve fixed on said stem intermediate the ends thereof, a gas control valve movable on said stem above said liquid control valve and a supplemental gas control valve in said stem having a bleed opening therethrough.

8. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container and means to open the second gas control valve upon the attainment of a predetermined pressure beneath the second valve.

9. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container and a spring constantly urging said second named gas control valve into open position.

10. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container, and a spring in said tube beneath said second named gas control valve constantly urging the said second named gas control valve into open position.

11. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container, means to open the second gas control valve upon the attainment of a predetermined pressure beneath the second valve and means to close all valves simultaneously.

12. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container, a spring constantly urging said second named gas control valve into open position and means to close all valves simultaneously.

13. A valve mechanism for counter-pressure fillers comprising, a hollow stem, a liquid control valve fixed on said stem intermediate the ends thereof, a gas control valve movable on said stem, a supplemental gas control valve in said stem having a bleed opening therethrough, means to open the first named gas control valve to permit flow of gas through said bleed opening into a container, a spring in said tube beneath said second named gas control valve constantly urging the said second named gas control valve into open position and means to close all valves simultaneously.

14. The method of operating a counter-pressure filler comprising the following steps: sealing the container to be filled with the filler valve, supplying counter-pressure gas slowly to the container, supplying liquid to the container and allowing the counter-pressure in the container to escape therefrom rapidly as the liquid enters, stopping the flow of liquid and gas simultaneously and removing the container from the filler valve.

15. The method of operating a counter-pressure filler comprising the following steps: sealing the container to be filled against the filler valve, supplying counter-pressure slowly to the container, supplying liquid to the container and allowing the counter-pressure in the container to escape therefrom rapidly, stopping the flow of liquid and gas simultaneously, venting excess gas from the top of the container and removing the container from the filler valve.

GEORGE L. N. MEYER.
HENRY F. STOCK.

No references cited.